Dec. 26, 1933.     A. J. HORTENAU     1,940,951
NECKTIE RACK
Filed Dec. 2, 1932
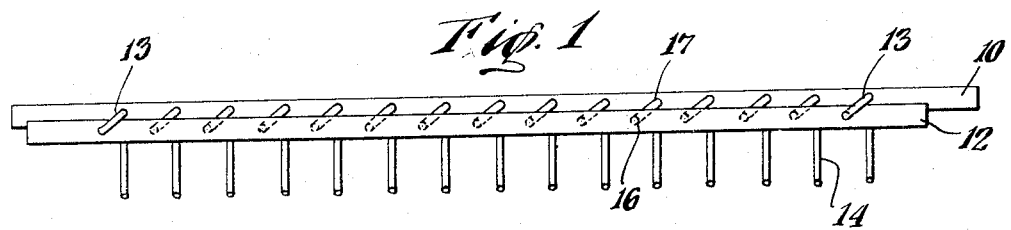
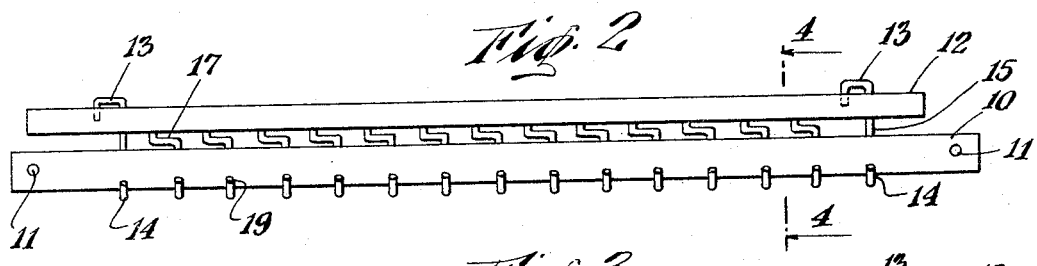
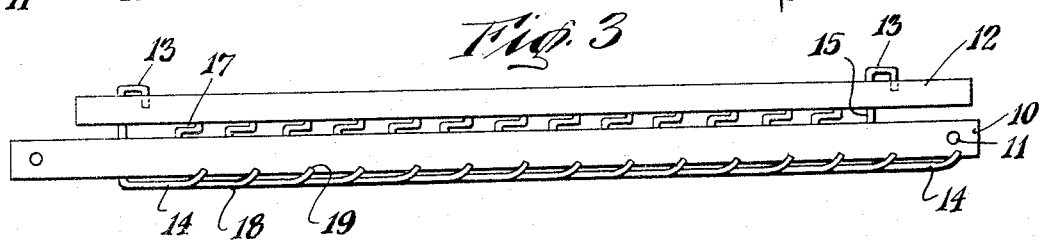
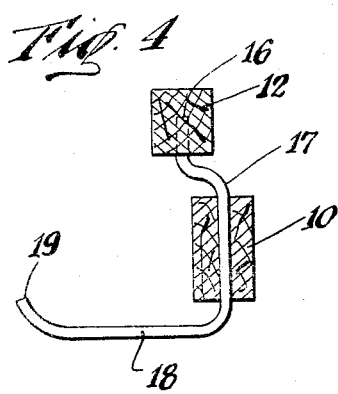
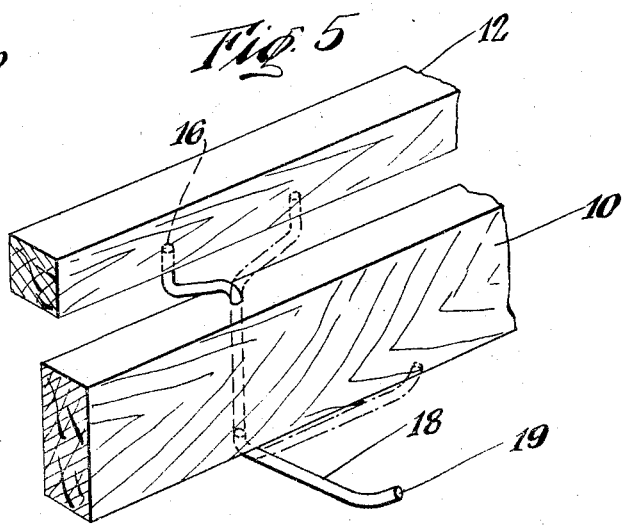
INVENTOR
Alfred J. Hortenau
BY
ATTORNEY Patented Dec. 26, 1933

1,940,951

UNITED STATES PATENT OFFICE 1,940,951

NECKTIE RACK

Alfred J. Hortenau, Sunnyside, Long Island, N. Y.

Application December 2, 1932. Serial No. 645,361

3 Claims. (Cl. 211—89)

This invention relates to improvements in display racks, particularly in racks for the display of neckties or the like, and it is the principal object of my invention to provide a necktie rack the hooks from which the neckties are suspended being movably passed through a stationary bar and at their upper ends being anchored in a movable bar, so that the displacement of the movable bar in one direction, for instance, towards the left, will arrange the hooks at an angle of substantially 45° to the stationary bar to allow of suspension of the neckties from the hooks, while a displacement of the movable bar relatively to the stationary bar in the opposite direction or towards the right will bring about the lateral engagement of the outer end of the hooks with the neckties suspended therefrom locked between two adjoining hooks and thus secured against accidental removal.

Another object of my invention is the provision of a necktie rack or holder of comparatively simple and inexpensive construction, yet durable and highly efficient in operation.

A further object of my invention is the provision of a necktie rack including a plurality of hooks of peculiar shape kept parallel in one position and laterally engaged in the other position, preferably of rounded wire to prevent damage to the neckties.

A still further object of my invention is the provision of a necktie holder, the movable bar of which is connected to the stationary bar by outer hook members anchored in the material of the movable bar and passed through the stationary bar.

These and other objects and advantages of my invention will become more fully known as the description thereof proceeds and will then be more specifically defined in the appended claims.

In the accompanying drawing forming a material part of this disclosure:

Fig. 1 is a top plan view of the necktie rack constructed according to my invention.

Fig. 2 is a front elevation of the rack in its position to secure the neckties for suspension from the hooks.

Fig. 3 is a view similar to Figure 2 with the hooks in their engaged position for locking the neckties against removal.

Fig. 4 is a cross-section on line 4—4 of Figure 2.

Fig. 5 is a fragmentary perspective view of a pair of bars on a somewhat enlarged scale illustrating the arrangement of the hooks.

As illustrated, a stationary bar 10 is adapted to be attached to any suitable support by screws or any other fastening means passed through openings 11.

A bar 12 movable relatively to the stationary bar is connected to the same by means of engagement of the hooked ends 13 of the outer end members or hooks 14, the shanks 15 of which are passed behind the movable bar 12 and through the stationary bar 10.

Between the outer securing members 13, the upper ends of a plurality of hook members are embedded in the material of the movable bar as best illustrated in Figure 4 at 16, and are then bent inwardly, as at 17, and passed downwardly through the stationary bar and bent outwardly, as indicated at 18 to have a hook 19 formed at their extreme outer ends.

In use, the stationary bar 10 is secured to any suitable support by means of screws or the like passed through holes 11 and if the movable bar 12 is then swung to the left, the hooks 18, 19 will assume the position illustrated in Figure 2 to allow a suspension of the neckties therefrom, while upon the swing of the movable bar to the right the hooks will assume the position illustrated in Figure 3, with the neckties engaged by the hooks and locked against removal.

It will be understood that I have described and shown the preferred form of my invention only as one example of the many possible ways to practically construct the same, and that I may make such changes therein as come within the scope of the appended claims without departure from the spirit of my invention and the principles involved.

Having thus described my invention, what I claim as new and desire to secure by Letters Patent is:

1. A necktie-rack comprising a stationary bar adapted to be secured to a support, a movable bar parallel and juxtaposed to and spaced from said stationary bar, hooks embedded at one end into the material of the movable bar movably passed through the stationary bar for connecting both bars, and a plurality of hooks anchored in the movable bar and passed through the stationary bar adapted for frontal extension for the suspension of neckties upon the movement of said movable bar towards one side and to clamp the neckties between each two adjoining hooks upon the movement of said movable bar in the opposite direction.

2. A necktie-rack comprising a longer stationary bar having end holes for the passage of fastening means for securing the bar to a support, and a shorter movable bar juxtaposed to and spaced from said stationary bar, end hooks in said movable bar passed with their shanks movably through said stationary bar for connecting both bars for relative movement, and a plurality of movable hooks between said end hooks anchored with their heads in said movable bar and movably passed through the stationary bar, knee parts formed with said hooks between both bars, and hooked ends formed therewith on the outside of said stationary bar for the suspension of neckties in one position of the movable bar with respect to the stationary bar, and to clamp the suspended neckties between the laterally moved hooked ends upon the movement of the movable bar to assume another position relatively to the stationary bar.

3. A necktie rack comprising a wider and longer, and a narrower and shorter bar spaced from said longer bar on the outside thereof, end hooks having their upper ends bent to grip over the outer edge of the smaller bar with their shanks passed through the material of said bars and bent at their lower ends into hooks for the suspension of neckties therefrom, and a plurality of smaller hooks between said end hooks having their head parts anchored in the material of the smaller bar and their shanks passed through the material of the longer bar and formed into hooks adapted for the suspension of neckties therefrom, said hooks so shaped as to lie flat against one another upon the shifting of the shorter bar relatively to the longer bar to facilitate packing of the rack when not in use and to clamp the neckties hung from said hooks to prevent their loss and falling off the hooks when the rack is used for display purposes.

ALFRED J. HORTENAU.